United States Patent
Cecconi

(10) Patent No.: US 6,456,470 B1
(45) Date of Patent: Sep. 24, 2002

(54) STARTING DEVICE FOR COMPRESSORS INCORPORATING A START OR RUN CAPACITOR

(75) Inventor: Pietro Cecconi, Monza (IT)

(73) Assignee: Electrica S.r.l., Milan (IT)

( * ) Notice: Subject to any disclaimer, the term of this patent is extended or adjusted under 35 U.S.C. 154(b) by 0 days.

(21) Appl. No.: 09/538,549

(22) Filed: Mar. 29, 2000

(30) Foreign Application Priority Data

Nov. 15, 1999 (IT) ........................................ PC990022 U

(51) Int. Cl.[7] ................................................ H02H 3/00
(52) U.S. Cl. ............................ 361/22; 361/23; 361/103
(58) Field of Search .............................. 361/22, 23, 24, 361/103

(56) References Cited

U.S. PATENT DOCUMENTS

| | | | | |
|---|---|---|---|---|
| 3,959,984 A | * | 6/1976 | Vlsak | 62/229 |
| 4,467,385 A | * | 8/1984 | Bandoli et al. | 361/24 |
| 4,547,825 A | * | 10/1985 | Vind | 361/22 |
| 5,055,726 A | * | 10/1991 | D'Entremont et al. | 361/24 |
| 5,200,872 A | * | 4/1993 | D'Entremont et al. | 361/25 |
| 5,345,126 A | * | 9/1994 | Bunch | 361/24 |
| 5,729,416 A | * | 3/1998 | Renkes et al. | 361/23 |

* cited by examiner

Primary Examiner—Stephen W. Jackson
(74) Attorney, Agent, or Firm—Notaro & Michalos P.C.

(57) ABSTRACT

A starting device for compressors has a PTC resistor and a protection device, both of which are inserted in a casing fitted with couplings for connection to the standard coupling pins present on compressors. A start capacitor or a run capacitor is also included in the casing. The device has a box-shaped casing with teeth or the like which is designed to snap onto the compressor structure, which box-shaped casing contains a thermal protection device, a starting device, in particular constituted by a PTC resistor, and a capacitor which may be a start capacitor or a run capacitor, as the case may be. The casing is fitted with a connector for connection to the pins of the standard connectors on compressors so that the assembly can be fitted simply by connecting the device to the compressor connector, the casing being snap-fitted into its seating in such a way as to eliminate the risk of its becoming disconnected even as a result of vibrations transmitted by the compressor motor.

6 Claims, 2 Drawing Sheets

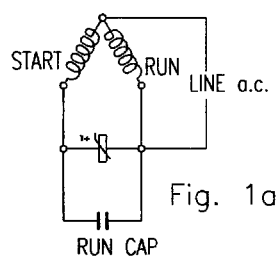
Fig. 1a
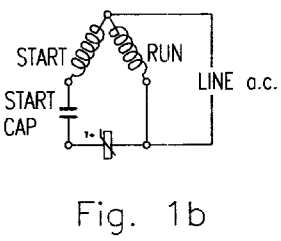
Fig. 1b
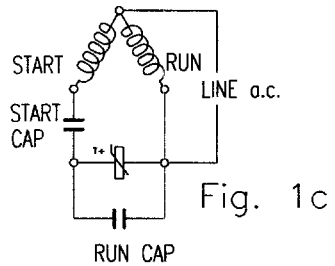
Fig. 1c
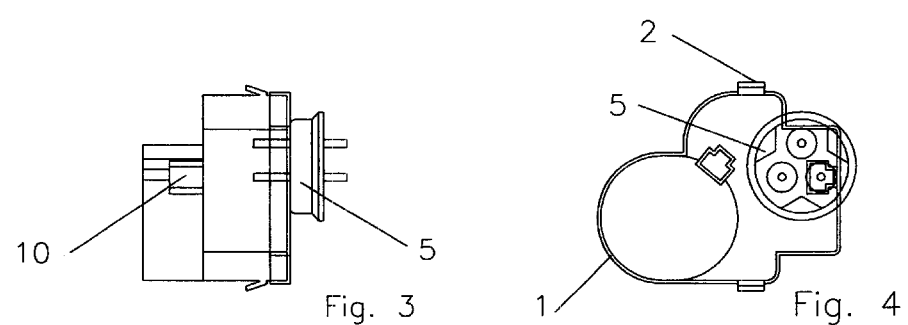
Fig. 3
Fig. 4
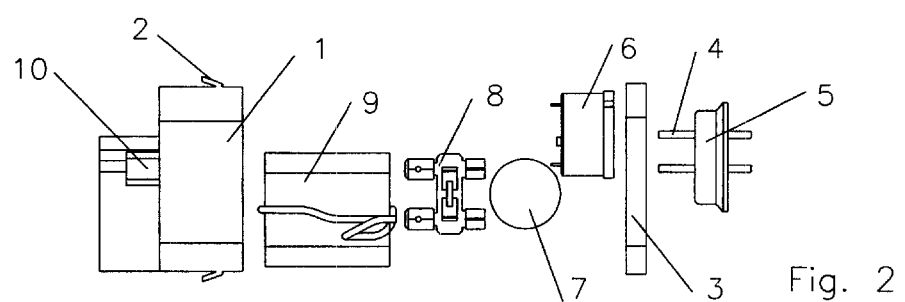
Fig. 2

STARTING DEVICE FOR COMPRESSORS INCORPORATING A START OR RUN CAPACITOR

FIELD AND BACKGROUND OF THE INVENTION

This invention relates to a starting device for compressors of the type comprising a PTC resistor and a protection device, both of which are inserted in a casing fitted with couplings designed for connection to the standard coupling pins present on compressors, which said device is characterised in that it also incorporates a start capacitor or a run capacitor.

In particular, the starting device in accordance with the invention comprises a box-shaped casing with teeth or the like which is designed to snap onto the compressor structure, which said box-shaped casing contains a thermal protection device, a starting device, in particular constituted by a PTC resistor, and a capacitor which may be a start capacitor or a run capacitor, as the case may be.

The casing is fitted with a connector designed for connection to the pins of the standard connectors on compressors so that the assembly can be fitted simply by connecting the device to the compressor connector, the casing being snap-fitted into its seating in such a way as to eliminate the risk of its becoming disconnected even as a result of the vibrations transmitted by the compressor motor.

In refrigerators, the motor and compressor are usually made in a single unit, enclosed in a sealed casing which is fitted with a standard three-pin connector designed for connection to the electricity supply.

Starting devices comprising means designed to supply the short-time pickup current needed to start the motor, which may be constituted by PTC resistors in the latest models, and protection devices able to cut off the power in the event of overheating or malfunction, are connected to these couplings.

Italian utility model application no. PC 98U 022, filed by the same inventor, describes a starting device that comprises a PTC resistor and a thermal switch fitted in a container with a coupling for a compressor connector on one side and terminals for connection to the power line on the other.

The invention relates to a device of this kind, characterised by the special configuration of the parts which enables a start capacitor or a run capacitor to be incorporated in the device.

According to the state of the art, when a start or run capacitor is fitted to a compressor, the capacitor is fixed outside the casing, and then connected via suitable connectors to the starting and protection devices.

Recently, starting and protection devices with a quick coupling for connection of a capacitor have also been developed, the capacitor being fitted outside the device in such a way as to project over the casing of the device.

However, this solution presents a number of drawbacks.

As a result of the vibrations generated by the compressor during operation, the capacitor, which is fitted to project over the body of the starting device, can become detached in time, with the result that means such as springs and the like designed to hold it in place are required.

This involves the additional cost of the said springs on the one hand, and the need for an additional assembly operation on the other.

Moreover, capacitors with couplings which can be rapidly connected to the body of the starting device have to be specifically manufactured, which involves a further increase in costs.

SUMMARY OF THE INVENTION

These drawbacks are solved by the present invention, which offers a starting device for compressors characterised in that it incorporates a start or run capacitor inserted directly in the casing which contains the starting and protection devices.

BRIEF DESCRIPTION OF THE DRAWINGS

This invention will now be described, by way of example but not of limitation, by reference to the annexed figures, in which:

FIGS. 1a, 1b and 1c illustrate the wiring diagrams of three different versions of the starting and protection device for compressors FIG. 2 is an exploded view of the various components that make up the device in accordance with the invention FIG. 3 illustrates the assembled device, seen from one side FIG. 4 is a plan view of the device FIGS. 5 and 6 correspond to FIGS. 3 and 4 respectively, and show the internal components.

DESCRIPTION OF THE PREFERRED EMBODIMENT

Figure 6:
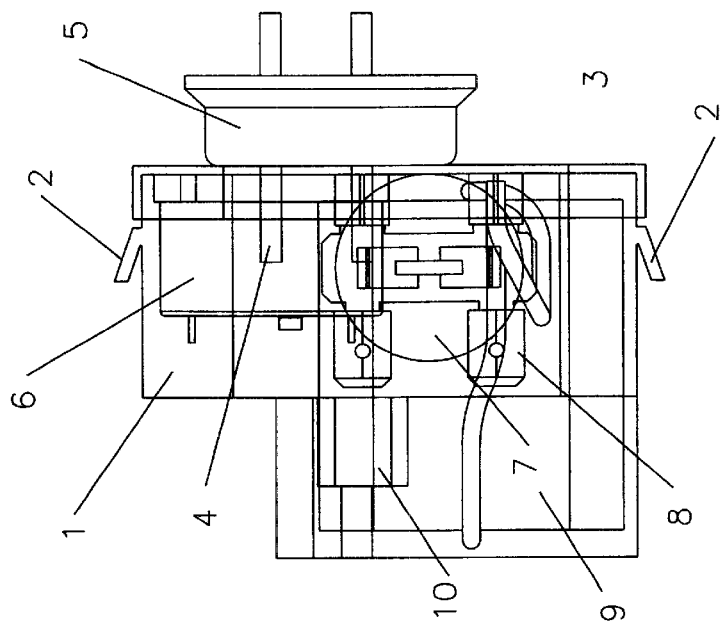
Figure 5:
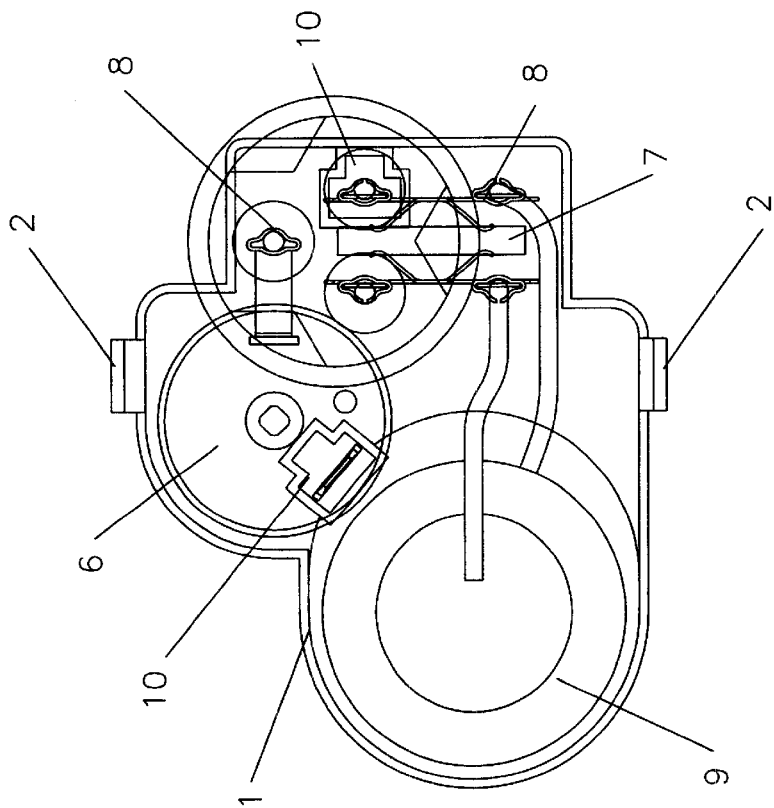

The wiring diagram of the device is illustrated in FIGS. 1a and 1b, in which FIG. 1a relates to a device fitted with a start capacitor, while FIG. 1b illustrates a device fitted with a run capacitor.

The device in accordance with the invention comprises (see FIG. 2) a container 1 fitted at the sides with pairs of teeth or fins 2 which project elastically outwards. Container 1 is closed at the base by a lid 3 which contains a set of holes through which pass pins 4 of a standard coupling 5 fitted to the body of the compressor.

Box shaped container 1, preferably made of moulded plastic, houses a protection device or protector 6, generally constituted by a thermal switch, a PTC resistor or starter 7, a set of contacts 8 destined to receive resistor 7, and a start or run capacitor 9.

A pair of couplings 10, which incorporate a pair of contacts for connection to the line, are fitted to box-shaped container 1.

The arrangement of the various components in box 1 can be seen in particular in FIG. 6.

Assembly of the device is quite easy, as the various components are basically placed side by side; as a result, container 1 can be made at the moulding stage with specific walls or guide ribs that allow the various components to be positioned precisely simply by inserting them in their seatings after making the electrical connections where necessary, by soldering or the like.

When the components have been inserted, the lid, also provided with snap-fitting devices, is closed, and the starting device can be connected to the compressor.

This operation is also very easy, as it is sufficient to connect body 1 on the side of lid 3 to the pins 4 of standard coupling 5.

A seating which presents walls containing holes in a position corresponding to that of fins 2 will preferably be made on the body of the compressor.

During insertion the said fins will consequently be elastically deformed, bending inwards, following which they will snap into the open position, securing body 1 in its seating once it has been connected to standard coupling 4 and fins 2 are positioned in correspondence with the holes. Fitting of the starting device to the compressor therefore requires a single simple operation, consisting merely of inserting the device into its seating and pushing it firmly in.

The engagement of fins 2 with the walls of holes prevents the device from becoming detached as a result of the vibrations generated by the compressor, and the device can be connected to the external line merely by inserting commonly used connectors into couplings 10.

The device can only be disconnected from the compressor with a tool which presses on the fins, not manually.

The sizes and the materials employed can obviously vary according to the required use.

What is claimed is:

1. A starting device for a refrigerator compressor having a seat for receiving a common container, the starter device comprising:

a common container (1) externally shaped to be received in the seat and internally shaped to receive a starter, a protector, and a capacitor;

a starter (7) engaged in the common container;

a protector (6) engaged in the common container;

a capacitor (9) engaged in the common container; and means (2) on the common container for holding the common container to the seat of the compressor, so that all parts of the starting device are installed at once on the compressor when the common container is seated in the seat.

2. A starting device according to claim 1, including a circuit in the common container to which the starter, the protector and the capacitor are wired, power connectors (10) connected to the circuit for powering the circuit, the connectors extending out from one side of the common container, and a coupling (5) for coupling to the compressor, the coupling being on an opposite side of the common container from the connectors.

3. A starting device according to claim 2, wherein the compressor has holes at the seat, the means (2) for holding the common container to the seat comprising snap-fitting fins for engaging the holes to hold the common container to the seat, the fins being positioned on the common container so that the coupling is coupled to the compressor when the fins are engaged to the holes.

4. A starting device according to claim 3, wherein the starter (7) comprises a PTC resistor, the protector (6) comprises a thermal switch and the capacitor (9) is a run capacitor or a start capacitor.

5. A starting device according to claim 4, wherein the common container has one open end and is shaped to slidably receive and fit the starter, the protector and the capacitor through the open end, the starter device including a lid (3) for closing the open end and for carrying the coupling, the circuit including pins extending through the coupling and electrically connecting the circuit to the compressor.

6. A starting device according to claim 5, including a set of contacts in the common container for holding the starter and for electrically connecting the capacitor to the circuit.

* * * * *